United States Patent [19]
Fujita et al.

[11] Patent Number: 5,144,203
[45] Date of Patent: Sep. 1, 1992

[54] CIRCUIT FOR DRIVING AN ELECTRIC FIELD LUMINOUS LAMP

[75] Inventors: Yuji Fujita; Kouzou Iwata, both of Shiga, Japan

[73] Assignee: NEC Corporation, Tokyo, Japan

[21] Appl. No.: 515,022

[22] Filed: Apr. 26, 1990

[30] Foreign Application Priority Data

Apr. 26, 1989 [JP] Japan .................................. 1-49770
May 31, 1989 [JP] Japan .................................. 1-138568
Aug. 29, 1989 [JP] Japan .................................. 1-222097

[51] Int. Cl.$^5$ ............................................. G09G 3/10
[52] U.S. Cl. .................................. 315/169.3; 315/226
[58] Field of Search ................... 315/169.3, 226, 246

[56] References Cited

U.S. PATENT DOCUMENTS 4,859,911  8/1989  Kinnard et al. .................. 315/169.3
4,949,016  8/1990  DeBijl et al. ........................ 315/226

Primary Examiner—Eugene R. LaRoche
Assistant Examiner—Tan Dinh
Attorney, Agent, or Firm—Sughrue, Mion, Zinn Macpeak & Seas

[57] ABSTRACT

A circuit for driving an electric field luminous lamp includes a DC-DC converter for generating a constant DC electric power output. The DC electric power is inverted to an AC electric power to drive an electric field luminous lamp. This results in a constant consumption of an electric power, so that the decrease of a brightness is avoided, a life of the lamp becomes long, and a fluctuation of an input DC voltage does not affect a fluctuation of an electric power consumption.

8 Claims, 11 Drawing Sheets 101, 102 SWITCHING PULSE GENERATING PEAK CURRENT DETECTING CIRCUIT

CIRCUIT FOR DRIVING AN ELECTRIC FIELD LUMINOUS LAMP

FIELD OF THE INVENTION

This invention relates to a circuit for driving an electric field luminous lamp, and more particularly to, a driving circuit for an electric field luminous lamp which is applied to a sheet light source, a backlight device for a liquid crystal display, and the like.

BACKGROUND OF THE INVENTION

An organic dispersion type of an electric field luminous lamp (simply called "electroluminescence lamp" hereinafter) is widely utilized, especially, for a backlight device which is included in a liquid crystal display to illuminate letters and figures in various measuring apparatus, etc.

Such an electroluminescence lamp which is of a capacitive load is driven by an AC power supply having, for instance, a fixed voltage of 120 V and a frequency of 400 or 600 Hz.

However, a brightness of the electroluminescence lamp is decreased in proportional approximately to a driven time, because fluorescent material is not only deteriorated to lower a luminous efficiency, but an equivalent capacitive component of the electroluminescence lamp is also decreased to increase an impedance thereof due to the deterioration of the fluorescent material, thereby decreasing a current flowing through the electroluminescence lamp, so that an electric power consumption is decreased in a resistive component of the electroluminescence lamp.

For the purpose of improving the decrease of the brightness, a self-excited inverter of a blocking oscillation type, in which a DC voltage is inverted to an AC high voltage having a high frequency, is used to drive an electroluminescence lamp in place of the fixed AC power supply. The inverter has a property of a constant current, so that a voltage applied across the electroluminescence lamp is increased, when an impedance of the electroluminescence lamp is increased due to the deterioration of the fluorescent material.

For the same purpose, a separately excited inverter including a pair of transistors which are alternately turned on and off, a transformer for transforming a DC voltage switched by the transistors to a predetermined AC voltage, a choke coil connected between the transformer and an electroluminescence lamp is used for driving the electroluminescence lamp.

In the power supply circuit, the AC voltage is applied through the choke coil across the electroluminescence lamp by the transformer, so that the electroluminescence lamp is driven to emit light of a predetermined brightness, wherein a power-factor of the electroluminescence lamp which is ordinarily as low as approximately 0.25 due to the capacitive component is not only improved, but the decrease of the brightness is also compensated by a reactance component of the choke coil.

However, the former inverter, in which a frequency of the AC voltage applied across the electroluminescence lamp is determined by circuit constants and an impedance of the electroluminescence lamp, has a disadvantage in that the frequency becomes fluctuated, because a capacitance of the electroluminescence lamp changes in proportional approximately to a driven time thereof. As a result, the frequency has a possibility to synchronize with a driving frequency of a liquid crystal display, so that flicker is caused to occur in the display. In addition, it has further disadvantages in that beat is produced due to a magnetic distortion of a transformer, because the transformer is driven in its operating principle in the state of a magnetic saturation, and in that a loss is large to provide an efficiency which is generally as low as less than 60%, because an oscillation and the increase of a voltage are carried out by use of a single transformer.

Although the latter inverter does not have the disadvantage of the former inverter, in which the driving frequency of the electroluminescence lamp is fluctuated, it has additional disadvantages in that it is difficult to be small in size, because the transformer and the choke coil are indispensable, and in that a conversion efficiency is not high as expected, because a loss is large in regard to a conversion time.

SUMMARY OF THE INVENTION

Accordingly, it is an object of this invention is to provide a circuit for driving an electric field luminous lamp in which the fluctuation of the driving frequency is avoided.

It is a further object of this invention to provide a circuit for driving an electric field luminous lamp in which beat is not produced.

It is a still further object of this invention to provide a circuit for driving an electric field luminous lamp in which a loss is decreased to increase an efficiency.

It is a yet still further object of this invention to provide a circuit for driving an electric field luminous lamp, a size of which can be small.

According to this invention, a circuit for driving an electric field luminous lamp, comprises:

a DC-DC converter for converting an input DC voltage to an output constant DC voltage; and a DC-AC inverter for inverting the output constant DC voltage to an AC voltage to drive electric field luminous lamp.

BRIEF DESCRIPTION OF THE DRAWINGS

This invention will be explained in more detail in conjunction with appended drawings, wherein.

DESCRIPTION OF THE PREFERRED EMBODIMENTS

Before explaining a circuit for driving an electric field luminous lamp in the first preferred embodiment according to the invention, the aforementioned conventional driving circuit including a fixed AC power supply, and the former and latter inverters will be explained in more detail.

Figure 1:
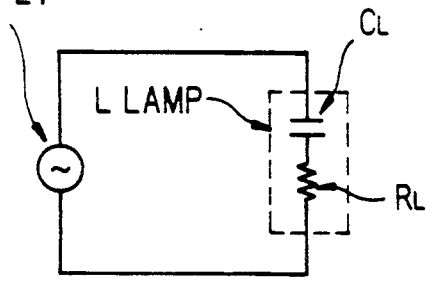
FIG. 1 is a circuitry diagram showing a driving circuit including an AC power supply.

FIG. 1 shows the aforementioned conventional driving circuit including a power supply Ao and an electroluminescence lamp L. The electroluminescence lamp L has a capacitance $C_L$ and a resistance $R_L$.

Figure 2:
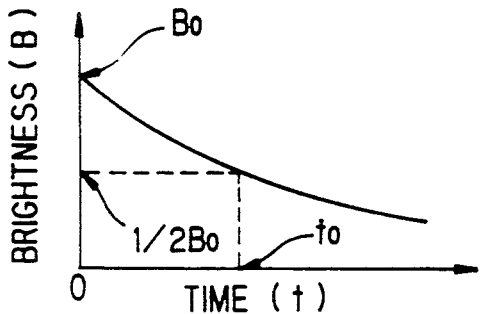
FIG. 2 is a graph explaining the decrease of a brightness of an electroluminescence lamp in proportional to a driven time.
Figure 3:
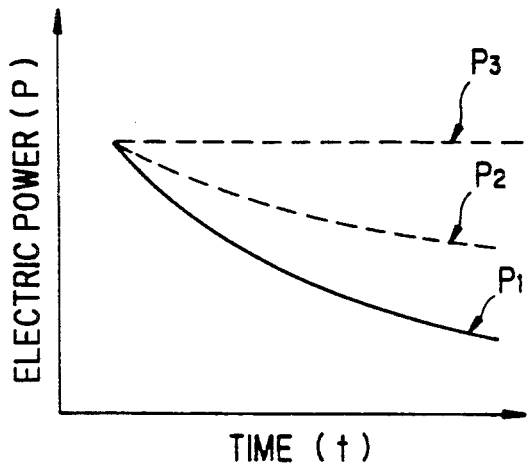
FIG. 3 is a graph explaining the decrease of electric power consumptions in three driving circuits.

In operation, a voltage of, for instance, 120 V and having a frequency of, for instance, 400 or 600 Hz is applied to the electroluminescence lamp L to emit a predetermined brightness of light. The brightness B is decreased in proportional approximately to a driven time t, as shown in FIG. 2, due to the degradation of fluorescent material, and the decrease of the capacitance $C_L$ and the resultant increase of an impedance caused by the degradation of the fluorescent material. Then, a life of the electroluminescent lamp L is considered to be terminated, when the brightness B becomes ½ Bo which is half an initial brightness Bo at a driven time $t_0$. The increase of the impedance decreases a current f 1 owing through the electroluminescent lamp L, thereby decreasing an electric power consumption $P_1$ of the electroluminescent lamp L, as shown in FIG. 3, so that the brightness B is additionally decreased.

Therefore, the aforementioned former inverter is used to improve the disadvantage in that the brightness is decreased.

Figure 4:
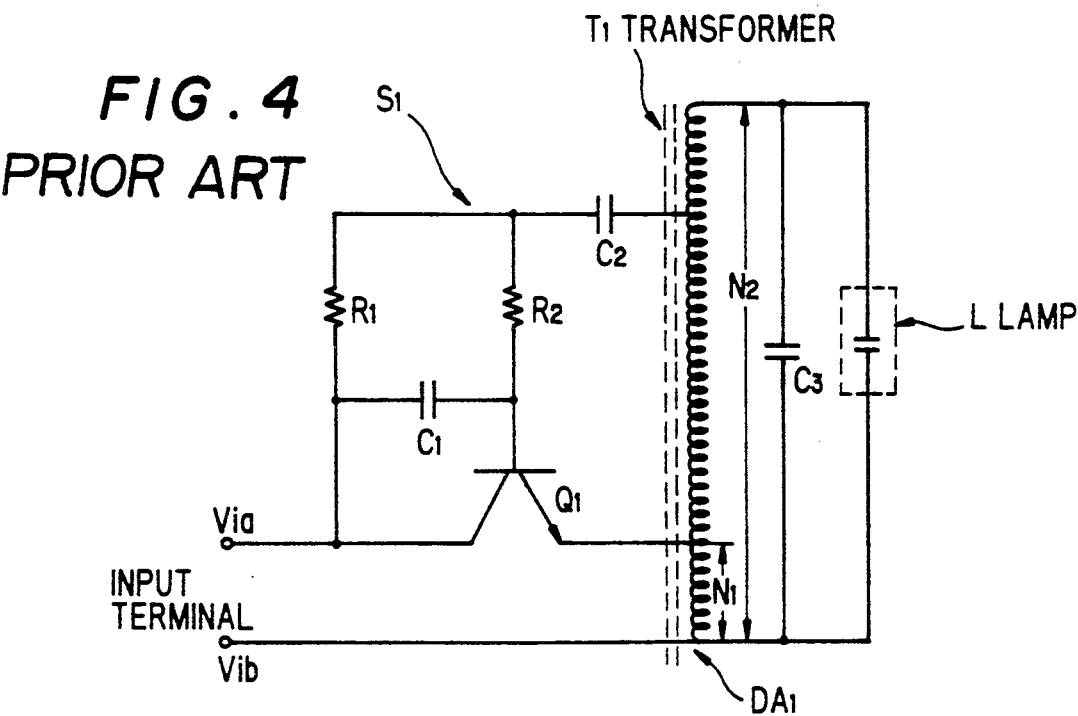
FIG. 4 is a circuitry diagram showing a first conventional circuit for driving an electric field luminous lamp.

FIG. 4 shows the former inverter DA1 which comprises a switching circuit $S_1$ having input terminals, to which a DC voltage Vcc is applied, and a transformer $T_1$ having a winding ratio $N_2N_1$. The switching circuit $S_1$ includes a transistor Q1 connected at a collector to the input terminal Via and at an emitter to the transformer $T_1$, resistances $R_1$ and $R_2$ and a capacitor $C_1$ connected between a base and the collector of the transistor $Q_1$, and a coupling capacitor $C_2$ connected between the base of the transistor $Q_1$ and the transformer $T_1$. In addition, a capacitor $C_3$ is connected in parallel with an electroluminescence lamp L on a side of a secondary winding of the transformer $T_1$.

In operation, the DC voltage Vcc is applied to the input terminals Via and Vib, so that the transistor $Q_1$ is turned on and off to supply an AC voltage to a primary winding of the transformer $T_1$. The AC voltage is transformed in accordance with the ratio $N_2N_1$ by the transformer $T_1$, so that a transformed AC voltage is applied across the electroluminescence lamp L. Here, a blocking oscillation will be explained in the inverter $DA_1$. At first, the transistor $Q_1$ is turned on, because a current flows from the input terminal Via, through the resistances $R_1$ and $R_2$, the base and the collector of the transistor $Q_1$, and the winding $N_1$ of the transformer $T_1$, to the input terminal Vib, so that the DC voltage Vcc is applied to the winding $N_1$ of the transformer $T_1$, through which a current is increased to flow in proportional to a time. This results in the increase of a voltage applied to the capacitor $C_3$. This current is a base current for the transistor $Q_1$ which is thereby held to be turned on. On the other hand, a magnetic flux flowing through a magnetic core of the transformer $T_1$ is increased in proportional to a time, so that a magnetic flux density becomes a saturation value to stop the increase of the magnetic flux. Then, a voltage applied to the capacitor $C_2$ is stopped to be increased. This provides operation in which a base-bias voltage for the transistor Q1 is reversed, so that the transistor $Q_1$ is abruptly turned off to accelerate a state, in which a current flowing through the winding $N_1$ of the transformer $T_1$ is shut off. Electric charges which are accumulated in the capacitor $C_2$ in a state, in which the transistor $Q_1$ is turned on, are continuously discharged through a discharging path including the input terminal Via, the resistance $R_1$, the capacitor $C_2$ and the transformer $T_1$, so that a voltage will be higher at the base of the transistor $Q_1$ than at the emitter thereof to result in the turning-on of the transistor $Q_1$.

In the turning-on and off of the transistor Q1, the capacitor $C_1$ functions as setting a response of the transistor $Q_1$ to be low, so that an output voltage wave of the transformer $T_1$ is shaped not to be a square wave, but to be a sinusoidal wave, and an extraordinary oscillation is avoided to occur. The capacitor $C_3$ has the same purpose, and has a further purpose for stabilizing operation of the electroluminescence lamp L. As apparent from the above, a driving voltage having a frequency determined by a repeated timing of the turning-on and off of the transistor $Q_1$ is applied across the electroluminescence lamp L to be driven. The inverter $DA_1$ of the blocking oscillation type has a constant current property, as described before, so that an electric power consumption $P_2$ is suppressed to be decreased as compared to the electric power consumption $P_1$ as shown in FIG. 3. However, the compensation of the luminous brightness B is limited to some extent. Therefore, it is difficult to extend to a life of the electroluminescence lamp L as long as expected.

Figure 5:
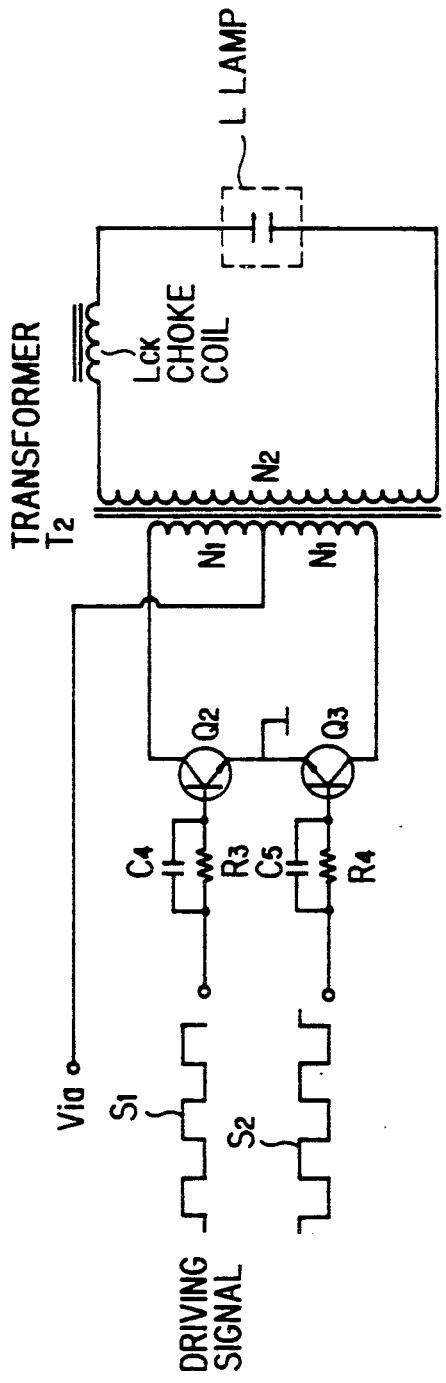
FIG. 5 is a circuitry diagram showing a second conventional circuit for driving an electric field luminous lamp.
Figure 6:
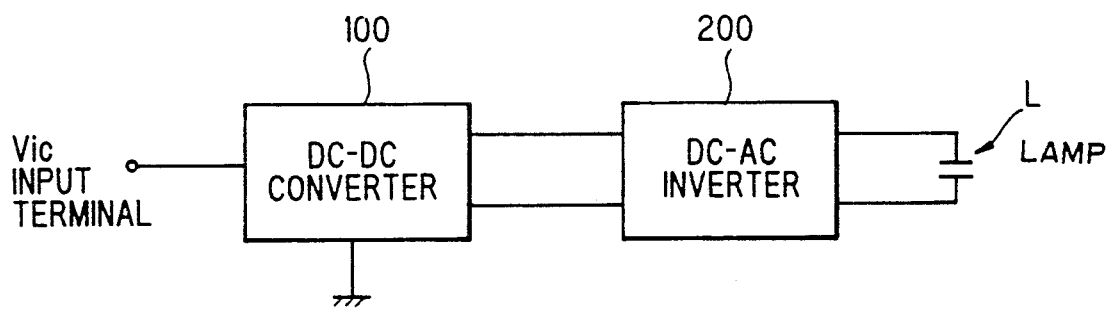
FIG. 6 is a block diagram showing a circuit for driving an electric field luminous lamp in a first preferred embodiment according to the invention.

Then, the aforementioned latter conventional inverter will be explained in FIG. 5. The inverter comprises transistors $Q_2$ and $Q_3$, respectively, connected at emitters to the ground, a transformer T2 connected at primary windings $N_1$ to collectors of the transistors $Q_2$ and $Q_3$ and at a secondary winding $N_2$ to a serial connection of an electroluminescence lamp L and a choke coil Lck, and parallel connections of a capacitor $C_4$ and a resistance $R_3$, and a capacitor $C_5$ and a resistance $R_4$, respectively, connected to bases of the transistors $Q_2$ and $Q_3$.

In operation, a DC voltage Vcc is applied to an input terminal Vic, and external driving signals $S_1$ and $S_2$ having opposite phases are supplied through the resistances $R_3$ and $R_4$ to the bases of the transistors $Q_2$ and $Q_3$, so that the transistors $Q_2$ and $Q_3$ are alternately turned on and off. Thus, the DC voltage is transformed with a winding ratio $N_2N_1$ by the transformer $T_2$, and a transformed AC voltage is applied across the electroluminescence lamp L, wherein a powerfactor which is ordinarily as low as 0.25 is improved by the choke coil Lck, and the decrease of the brightness is compensated by a reactance component of the choke coil Lck. The disadvantages of this separately excited inverter which were explained before are not described here.

Next, a circuit for driving an electric field luminous lamp in the first preferred embodiment according to the invention will be explained.

The driving circuit comprises a DC-DC converter 100 for generating an output of a constant power and a DC-AC converter 200 for generating an AC voltage, wherein an electric field luminous lamp L is driven by the AC voltage supplied from the DC-AC inverter 200. In this driving circuit, an electric power consumption P3 becomes constant as shown in FIG. 3, because a constant power is supplied from the DC-DC converter 100 through the DC-AC inverter to the electroluminescence lamp L. Therefore, an output voltage of the DC-DC converter 100 is increased to make an electric power constant in a case where an impedance of the electroluminescence lamp L is increased to decrease a current flowing therethrough.

Consequently, an applied voltage of the electroluminescence lamp L becomes large to avoid the decrease of the brightness B. Even if an input voltage of the DC-DC converter 100 is fluctuated, an output power of the DC-DC converter 100 is constant, so that the brightness B of the electroluminescence lamp L is not fluctuated.

This means that a feature of this invention is to utilize the DC-DC converter 100 for providing an output of a constant electric power. Therefore, the DC-AC inverter may be of a conventional one which is of the aforementioned blocking oscillation type.

Figure 7:
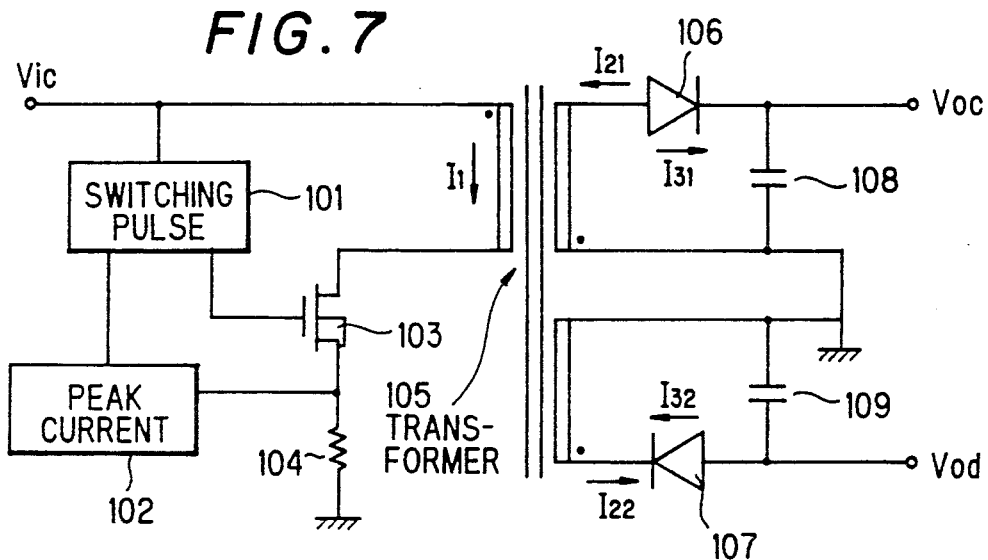
FIG. 7 is a circuitry diagram showing a DC-DC converter as used in the first preferred embodiment.

FIG. 7 shows a ringing choke type of the DC-DC converter 100 which has an input terminal Vic and output terminals Voc and Vod, and comprises a switching pulse generating circuit 101, a peak current detecting circuit 102, a switching electric field transistor 103, a peak current detecting resistance 104, a transformer 105 connected at a primary winding to the input terminal Vic and the electric field transistor 103, rectifying diodes 106 and 107 connected to secondary windings of the transformer 105, and smoothing capacitors 108 and 109, respectively, connected between the output terminal Voc and the ground, and between the output terminal Vod and the ground, wherein the field effect transistor 103 is connected at a source to the transformer 105, and at a drain to the resistance 104 connected to the ground, and the secondary winding of the transformer 105 is divided into two groups, to each of which a corresponding one of the diodes 106 and 107 is connected in series, and a corresponding one of the capacitors 108 and 109 is connected in parallel.

Figure 8:
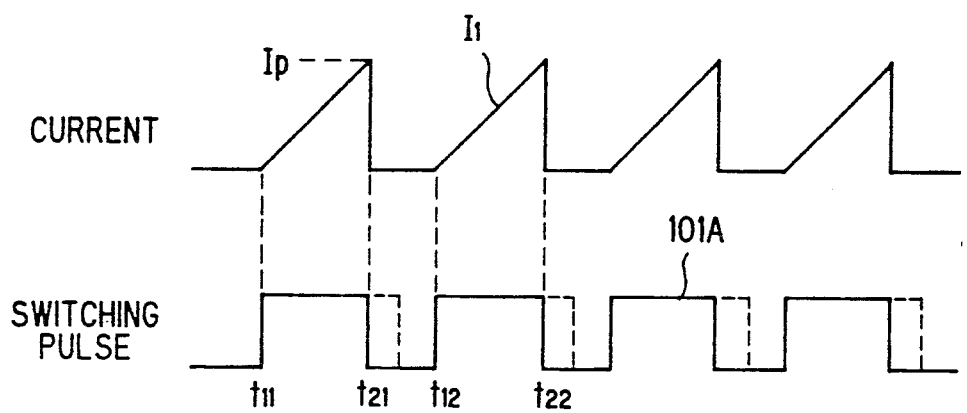
FIG. 8 is a timing chart explaining operation of the DC-DC converter as shown in FIG. 7, FIGS. 9 and 10 are circuitry diagrams showing other DC-DC converters applied to the first preferred embodiment.

In operation, a DC input voltage Vi of, for instance, 12 V is applied through the input terminal Vic to the primary winding of the transformer 105 and the switching pulse generating circuit 101, so that a square wave switching pulse 101A is generated in the switching pulse generating circuit 101, as shown in FIG. 8, to be applied to a gate of the transistor 103 which is then turned on. Thus, a current I1 flowing through the primary winding of the transformer 105 starts rising at a time $t_{11}$ as shown in FIG. 8. When the current I1 is increased to be a predetermined peak value Ip at a time $t_{21}$, the peak current detecting circuit 102 controls the switching pulse generating circuit 101 to be turned off in accordance with a potential of Ip x Rp at a connected point between the transistor 103 and the resistance 104, where Ip is a current flowing through the resistance 104 and Rp is a value of the resistance 104. When the current $I_1$ flows through the primary winding of the transformer 105, currents $I_{21}$ and $I_{22}$ flow through the secondary windings of the transformer 105, and are interrupted to be supplied from the output terminals Voc and Vod by the diodes 106 and 107 which are positioned in a reverse direction to the currents $I_{21}$ and $I_{22}$, so that an electric energy is accumulated in the secondary windings of the transformer 105. Then, when the current $I_1$ is interrupted by the turned-off transistor 103, a transit current flows through the primary winding of the transformer 105 in a reverse direction to the current $I_1$. Simultaneously, the electric energy accumulated in the secondary windings of the transformer 105 causes currents $I_{31}$ and $I_{32}$ to flow through the diodes 106 and 107. The same operation is repeated at a period of times $t_{12}$ to $t_{22}$, and at following periods, so that the currents I31 and I32 flow through the diodes 106 and 107 in one direction. Consequently, a constant DC voltage which is stepped up by the transformer $T_2$ is supplied from the output terminals Voc and Vod to the DC-AC inverter 200.

In this circumstance, an output electric power Pa is defined by the following equation.

$$Pa = \tfrac{1}{2} L_T \mathrm{Ip}^2 \cdot f \cdot n$$

where $L_T$ is an inductance of the transformer 05, Ip is a peak current at the primary winding of the transformer 105, f is a switching frequency, and n is a conversion efficiency of the DC-DC converter 100.

In the above equation, $L_T$ and f are constant, and n is approximately constant, so that the power Pa can be constant by setting the peak current to be constant in accordance with the detection of the peak current Ip in the peak current detecting circuit 102.

In addition, even if a rising inclination of the current I1 flowing through the primary winding of the transformer 105 changes due to the change of an input voltage Vi applied to the input terminal Vic, that is, the inclination becomes steep in a case where the input voltage Vi is high, the power can be constant, provided that a timing of the turning-off of the transistor 103 changes, because the peak current Ip is held to be constant by the peak current detecting circuit 102.

Figure 9:
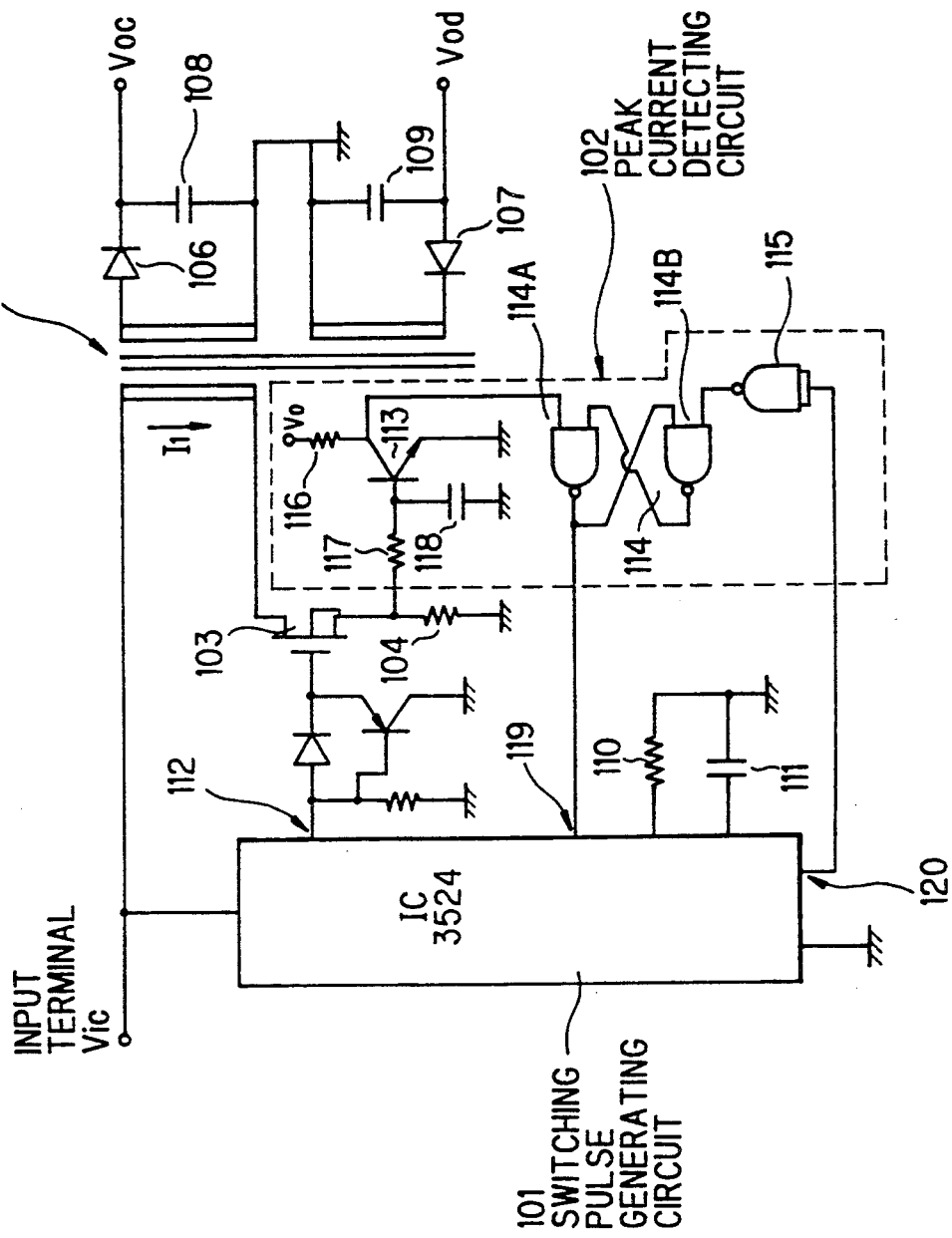
Figure 10:
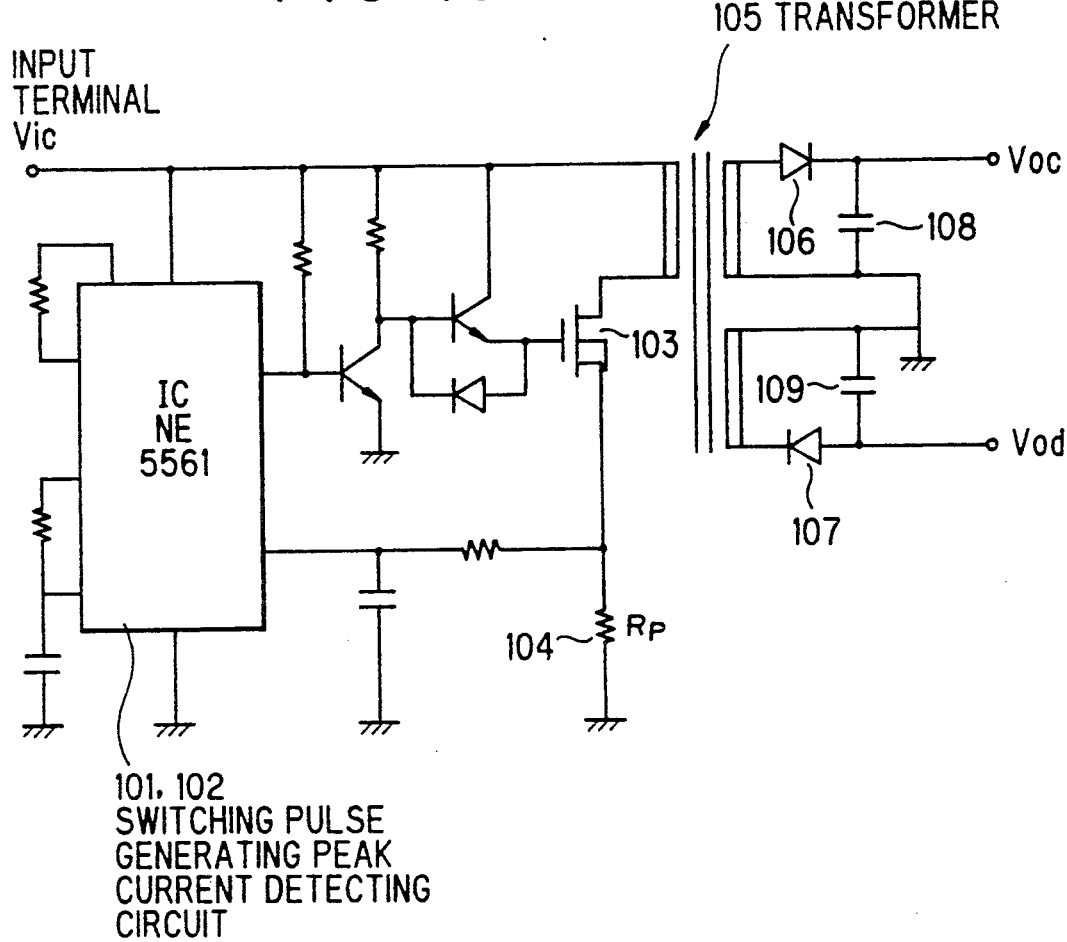

The DC-DC converter 100 may be of circuits as shown in FIGS. 9 and 10, wherein like parts are indicated by like reference numerals and symbols as used in FIG. 7.

In FIG. 9, the switching pulse generating circuit 101 is of an IC for controlling of a switching power supply as specified "IC 3524", in which an oscillation frequency f is determined by a time constant of a variable resistance 110 and a capacitor 111, and from an output terminal 112 of which a switching pulse 101A (FIG. 8) is supplied to the transistor 103, and the peak current detecting circuit 102 comprises a transistor 113, a set-reset type flip-flop 114, an inverter 115, resistances 116 and 117, and a capacitor 118.

In operation, when an input voltage Vi is applied to the input terminal Vic, the switching pulse 101A is supplied from the output terminal 112 to the transistor 103 which is thereby turned on, so that a current $I_l$ flowing through the primary winding of the transformer 105 flows through the resistance 104. Then, when the current $I_l$ is increased to be the peak current Ip to apply a voltage of the product Ip·Rp to the transistor 113 which is thereby turned on. As a result, a collector of the transistor 113 is at the ground potential, so that a low-level signal is applied to an input terminal 114A of the flip-flop 114 to apply a high-level signal to a terminal 119 of the switching pulse generating circuit 101. Consequently, the switching pulse 101A falls to be in an OFF state. Next, when a rising of the switching pulse 101A is detected to apply a high-level signal to the inverter 115, a low-level signal is applied to an input terminal 114B of the flip-flop 114, so that a high-level signal is applied to an input terminal 114C of the flip-flop 114. Thus, a low-level signal is applied from the flip-flop 114 to the terminal 119 of the switching pulse generating circuit 101, because a voltage Vo which is a high-level signal is applied to the input terminal 114A of the flip-flop 114. Consequently, the switching pulse 101A is supplied from the terminal 112 of the switching pulse generating circuit 101 to the transistor 103. This is repeated in operation to hold the peak current Ip to be constant, so that the power Pa can be constant.

In FIG. 10, the switching pulse generating circuit 101 and the peak current detecting circuit 102 are replaced by an IC for controlling a switching of power supply controlling IC including a built-in comparator as specified "NE 5561", and like parts are indicted by like reference numerals and symbols.

Figure 11:
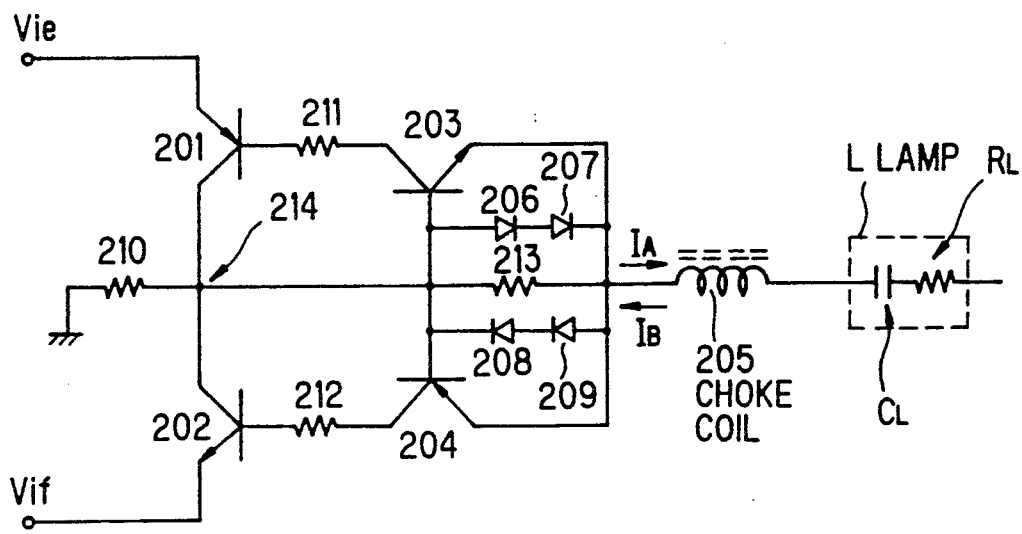
FIG. 11 is a circuitry diagram showing a DC-AC inverter as used in the first preferred embodiment.

The DC-AC inverter 200 is structured, for instance, by a circuit which is shown in FIG. 11. The circuit is of a serial resonant method which can be applied to this invention, in addition to the aforementioned blocking oscillation type, and includes switching transistors 201 and 201, current polarity detecting transistors 203 and 204, a choke coil 205, an electroluminescence lamp L including a capacitance $C_L$ and a resistance $R_L$, diodes 206 to 209, and resistances 210 to 213, wherein a DC voltage is applied across input terminals Vie and Vif to drive the electroluminescence lamp L.

Figure 12:
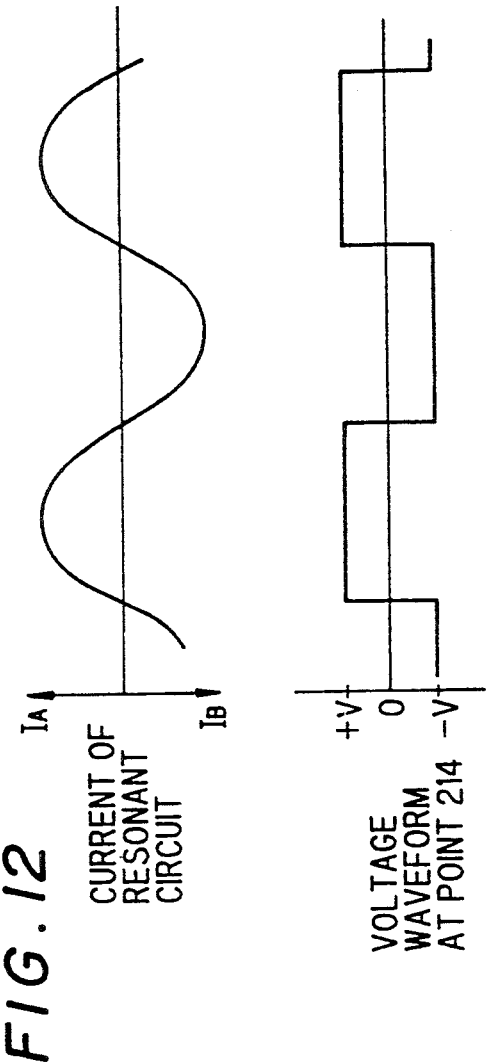
FIG. 12 is a timing chart explaining operation of the DC-AC inverter as shown in FIG. 11.

In operation, when a D-C voltage of potentials +V and −V is applied to the input terminals Vie and Vif, respectively, a sinusoidal current indicated in FIG. 12 by $I_A$ and $I_B$ flows through the choke coil 205, while a square wave voltage indicated in FIG. 12 by +V and −V is generated at a connecting point 214 between the transistors 201 and 202, and between the resistances 210 and 213, so that the electroluminescence lamp L is driven.

A circuit for driving an electric field luminous lamp in the second preferred embodiment according to the invention will be explained in FIG. 13, wherein like parts are indicated by like reference numerals and symbols as used in FIGS. 6, and 9 to 11. The circuit comprises the DC-DC converter 100, the DC-AC inverter 200, an oscillation circuit 300 for generating a driving frequency $f_L$, and a control circuit 400 for generating timing signals supplied to the DC-AC inverter 200. The DC-AC inverter 200 includes field effect transistors 220 to 223, diodes 224 to 227, and resistances, capacitors and zenor diodes not designated by reference numerals, and is connected to a serial connection of a choke coil 228 and an electroluminescence lamp L.

Figure 14:
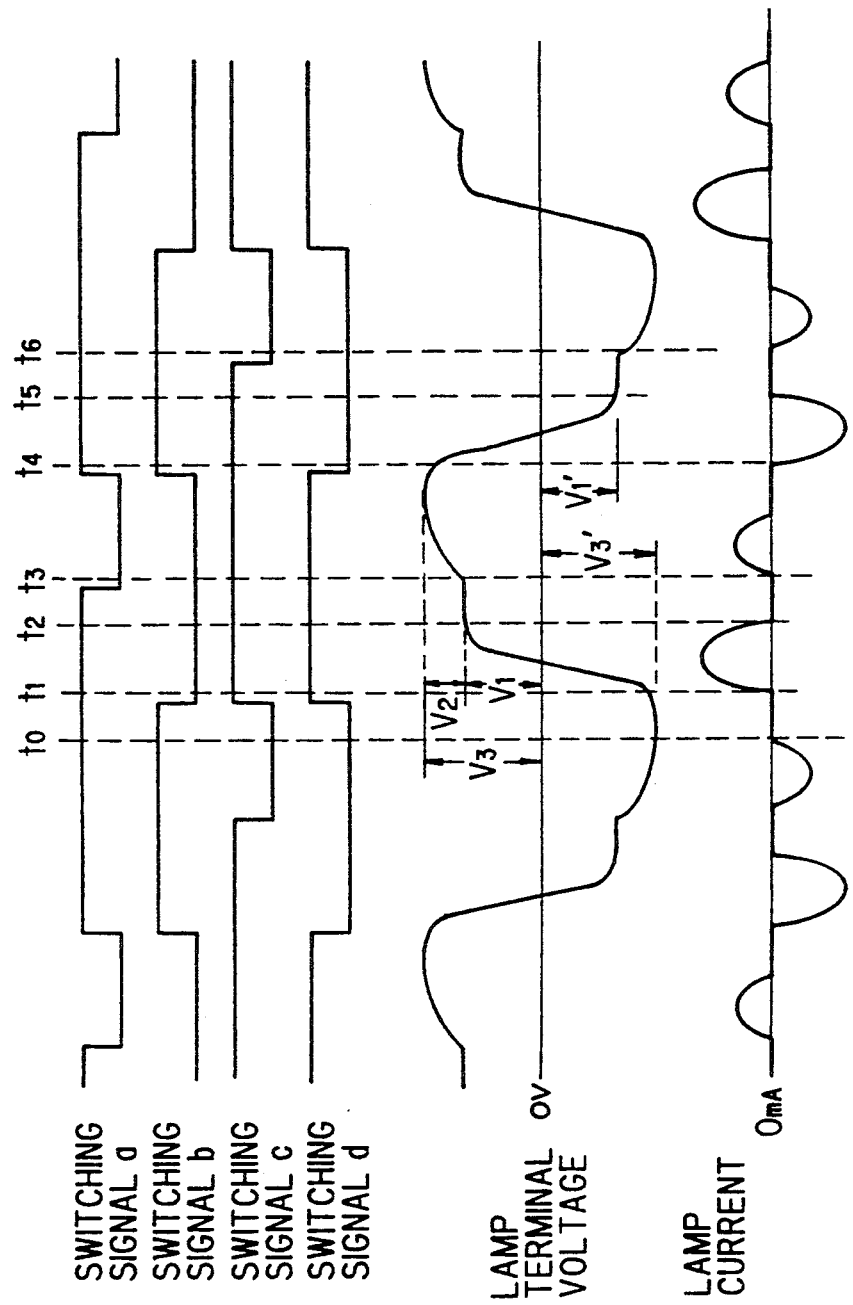
FIG. 14 is a timing chart explaining operation in the second preferred embodiment.

In operation, if it is assumed that a timing is at the time $t_0$ as shown in FIG. 14, the field effect transistors 221 and 222 are turned on by the timing signals b and c supplied from the control circuit 400, a closed circuit is provided by a path including the turned-on field effect transistor 222, to which a DC output voltage $V_L$ of the DC-DC converter 100 is applied, the diode 226, the electroluminescence lamp L, the choke coil 228, the turned-on field effect transistor 221, and the ground. At this time $t_0$, a terminal voltage of the electroluminescence lamp L is such that a voltage at a terminal A which is determined based on a voltage at a terminal B is expressed by a negatively charged voltage $V_3'$ as shown in FIG. 14. Next, the field effect transistors 221 and 222 are turned off at a time $t_1$ by the timing signal b and c, and the field effect transistor 223 is simultaneously turned on by the timing signal d supplied from the control circuit 400, so that a closed circuit is provided by a path including the electroluminescence lamp L, the turned-on field effect transistor 223, the ground, the diode 225, and the choke coil 228. Thus, electric charges which are accumulated in the electroluminescence lamp L at the time $t_0$ are discharged at the time $t_1$. The discharging current is increased in proportional to a time by an effect based on an inductance of the choke coil 228 and a capacitance of the electroluminescence lamp L, and is decreased to be zero. Then, although the discharging current tends to flow in a reverse direction, such a current can not flow therethrough, because the field effect transistor $Q_2$ is in an OFF state. From the times $t_1$ to $t_2$, a voltage at the terminal A is increased in a positive direction up to a level of $V_1$ by the effect of the serial connection of the electroluminescence lamp L and the choke coil 228. Thereafter, the field effect transistor 220 is turned on at the time $t_3$ by the timing signal a supplied from the control circuit 400, in addition to the turned-on field effect transistor 223, so that a closed circuit is provided by a path including the DC output voltage of the DC-DC converter 100, the turned-on field effect transistor 220, the diode 224, the choke coil 228, the electroluminescence lamp L, the turned-on field effect transistor 223, and the ground. Thus, a charging current flows from the DC-DC converter 100 to the electroluminescence lamp L. At this time $t_3$, electric charges which are accumulated into the closed circuit are consumed in a light emission of the electroluminescence lamp L in addition to an electric loss in the closed circuit, because electric charges of the same polarity are already accumulated into the electroluminescence lamp L at the time $t_2$. Then, the field effect transistors 220 and 223 are turned off at the time $t_4$, and the field effect transistor 221 is turned on at the same time, so that electric charges accumulated in the electroluminescence lamp L are discharged in a direction opposite to the direction of the time $t_1$. Then, the electroluminescence lamp L is accumulated at the time $T_5$ with electric charges having a polarity reverse to the charges accumulated at the time $t_2$ for the same reason as described at the times $t_1$ and $t_2$. After the time $t_5$, the field effect transistors 221 and 222 are turned on at the time $t_6$, so that the electroluminescence lamp L is charged in a polarity reverse to that the time $t_3$ for the same reason as described at the time $t_3$. Thus, the electroluminescence lamp L is driven in a constant frequency by repeating operation as explained from the time $t_0$ to the time $t_6$, so that a strong emission of light is generated during periods between the times $t_1$ and $t_2$, and $t_4$ and $t_5$.

In the DC-AC inverter as explained above, the diodes 224 and 226 operate to avoid the flowing of current into the DC-DC converter 100, when the charging-finished voltages $V_3$ and $V_3'$ of the electroluminescence lamp L is higher than the DC output voltage of the DC-DC converter 100, while the diodes 225 and 227 are parasitically included in the field-effect transistors 221 and 223, so that they are not always necessary to be provided externally.

Figure 15:
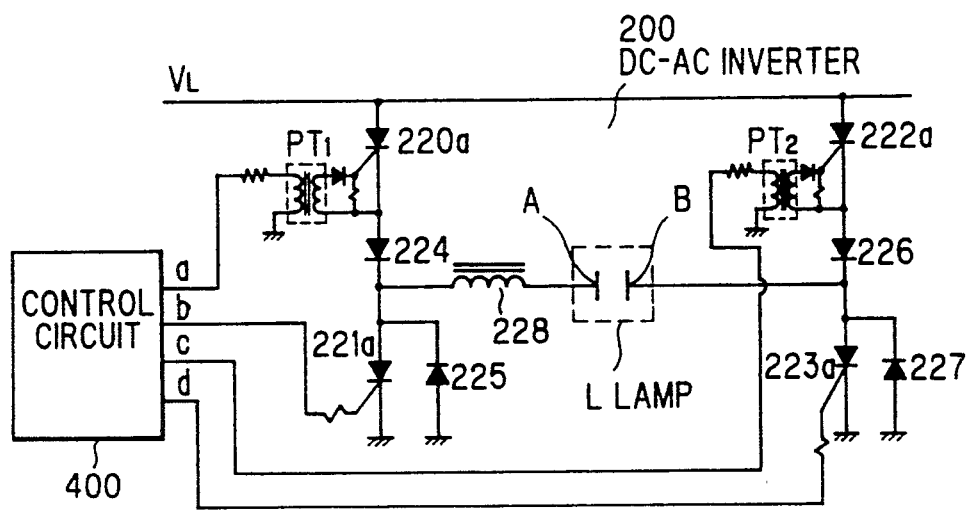
FIG. 15 is a circuitry diagram showing a modification of the second preferred embodiment.
Figure 16:
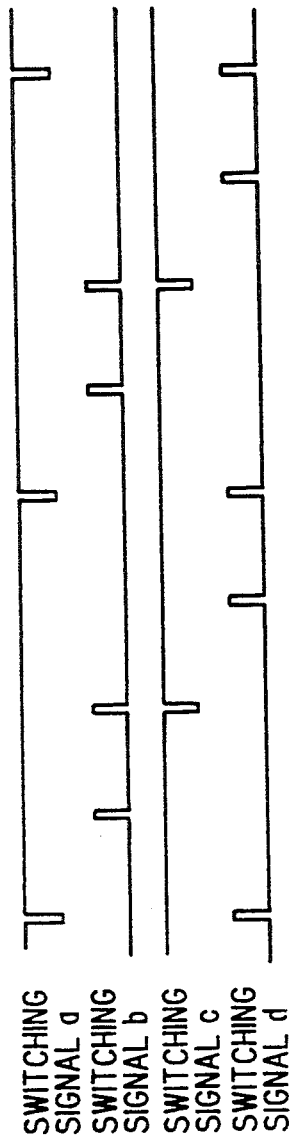
FIG. 16 is a timing chart explaining operation in FIG. 15.

In the second preferred embodiment, the oscillation circuit 300 may be of a timer IC such as $\mu$PC 1555 which utilizes, for instance, a CR constant. Furthermore, the field effect transistors 220 to 223 may be replaced by thyristors or bipolar transistors. In a case of utilizing thyristors 220a to 223a as shown in FIG. 15, timings at which the transistors 220a to 223a are turned on is controlled by external timing signals a, b, c and d supplied from the control circuit 400 as shown in FIG. 16, while the thyristors 220a to 223a are automatically turned off, when a current flowing through each of the thyristors 220a to 223a becomes zero. The timing signals a and c are supplied to potential transformers $PT_1$ and $PT_2$.

As understood from the second preferred embodiment, a driving frequency can be set not to synchronize with a driving frequency of a liquid crystal display, because the external oscillation circuit 300 is provided to drive the electroluminescence lamp L. Furthermore, the choke coil 228 can be small, because a resonant frequency based on a inductance of the choke coil 228 and a capacitance of the electroluminescence lamp L is set to be higher than the driving frequency of the electroluminescence lamp L, and no beat is produced due to a magnetic distortion because the choke coil 228 si used in a range in which no magnetic saturation occurs. At the same time, an inverter of an efficiency as high as 70 to 80% can be realized in the inclusion of a DC-DC converter, because a LC serial resonance is utilized between the choke coil 228 and the electroluminescence lamp L, and a life of the electroluminescent lamp L can be extended as compared to a case of using a blocking oscillation inverter by 1.5 times, because the DC-DC converter 100 of a constant electric power output type is used to compensate the decrease in a brightness of the electroluminescence lamp L. Therefore, it can be applied to a personal computer of a lap-top type which is driven by a power supply battery, because a stable brightness is obtained, even if a voltage is decreased in the power supply battery.

Figure 13:
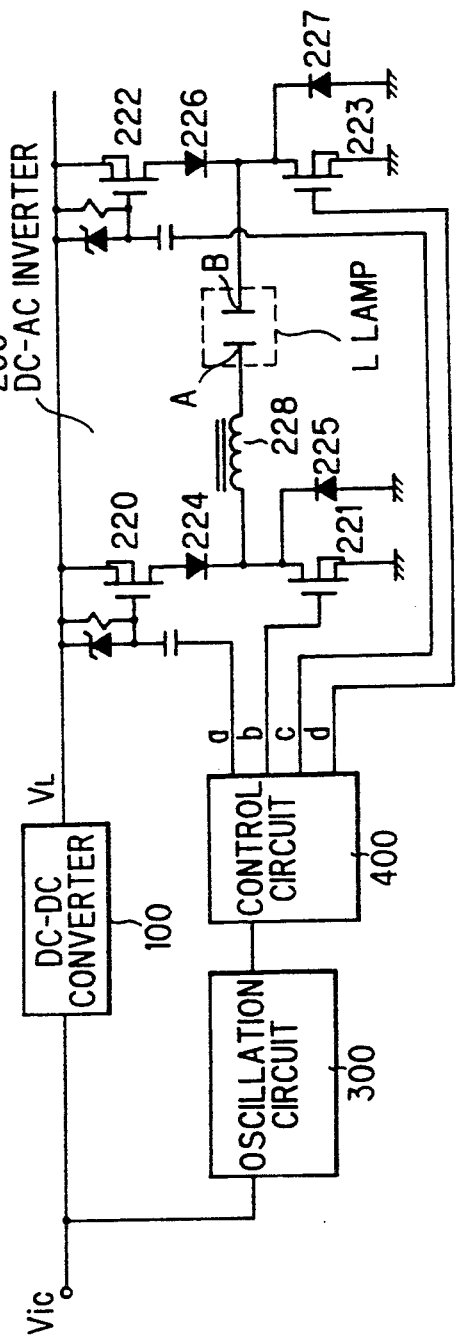
FIG. 13 is a circuitry diagram showing a circuit for driving an electric field luminous lamp in a second preferred embodiment according to the invention.
Figure 17:
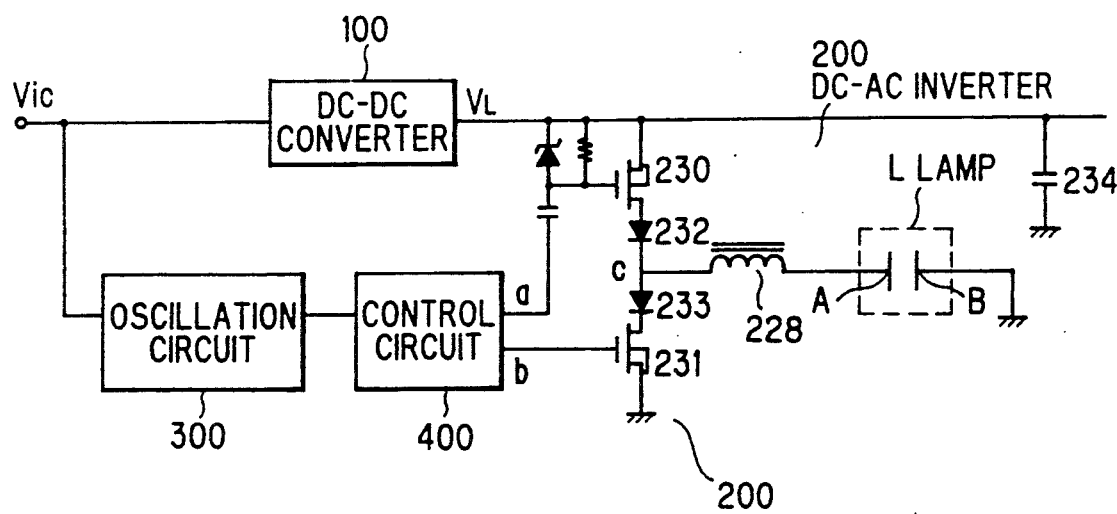
FIG. 17 is a circuitry diagram showing a circuit for driving an electric field luminous lamp in a third preferred embodiment according to the invention.

FIG. 17 shows a circuit for driving an electric field luminous lamp in the third preferred embodiment according to the invention, wherein like ports are indicated like reference numerals and symbols as used in FIGS. 13 and 15, except that the DC-AC inverter 200 is different in structure from the second preferred embodiment, in that field effect transistors 230 and 231 are provided to be turned on and off by switching signals a and b supplied from the control circuit 400, and diodes 232 and 233 are provided between the switching transistors 230 and 231. In addition, the terminal B of the electroluminescence lamp L is connected to the ground, and the output terminal of the DC-DC converter 100 is connected to a capacitor 234 connected at an opposite terminal to the ground.

Figure 18:
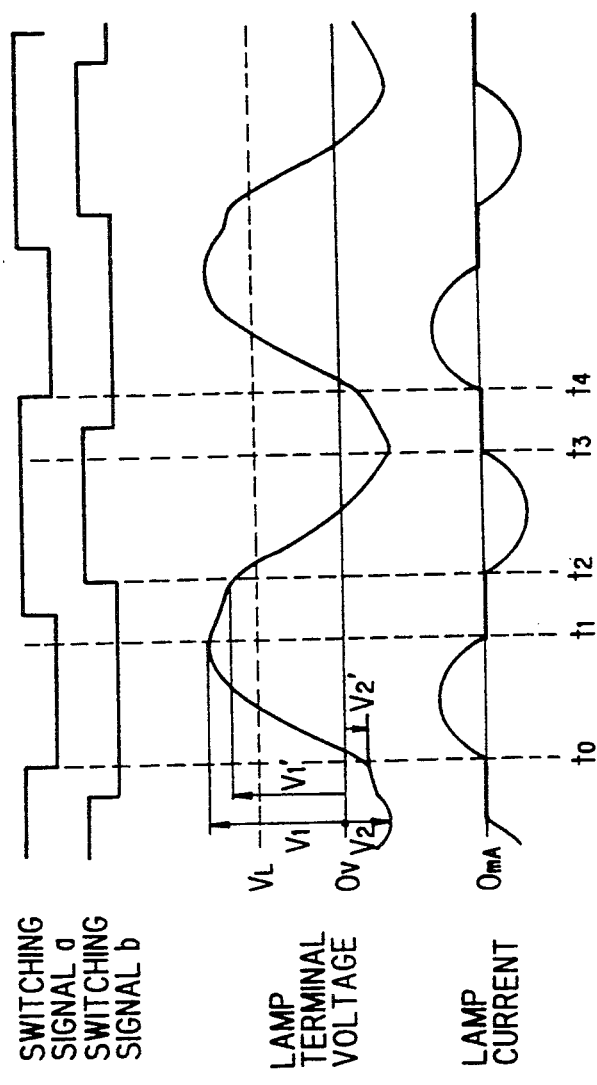
FIG. 18 is a timing chart explaining operation in the third preferred embodiment.

In operation, it is assumed that the electroluminescence lamp L is charged at the time $t_0$ by a negative voltage $V_2'$ as shown in FIG. 18. When the switching transistor 230 is turned on at this timing, electric charges of the electroluminescence lamp L is discharged by a path including the output terminal of the DC-DC converter 100, the switching transistor 230, the diode 232, the choke coil 228, the electroluminescence lamp L, and the ground. Thereafter, the terminal A of the electroluminescence lamp L is charged in a positive polarity, and is increased to a voltage $V_1$ which is higher than the DC output voltage of the DC-DC converter 100 at the time $t_1$ by a serial resonance of the electroluminescence lamp L and the choke coil 228. During this period, a current crosses a zero-point, while a voltage is increased at a point C of connecting the diodes 232 and 233 and the choke coil 228 to the voltage $V_1$. Thus, although the switching transistor 230 is biased in a reverse direction, a reverse current is avoided to flow therethrough in the presence of the diode 232. That is, the field effect transistor 230 functions as being in an OFF state, although it is turned on by the switching signal a. Next, the field effect transistor 231 is turned on at the time $t_2$ by the switching signal b. During the period $t_1$ to $t_2$, no current flows through the field effect transistors 230 and 231, so that a voltage of the electroluminescence lamp L is decreased at the terminal A to be a voltage $V_1'$ at the time $t_2$ due to the self-discharge thereof, and the field effect transistor 231 is simultaneously turned on to provide a discharging path including the electroluminescence lamp L, the choke coil 228, the diode 233, the field effect transistor 231, and the ground. As a result, the voltage of the electroluminescence lamp L is decreased at the terminal A. After a complete discharge of the electroluminescence lamp L, it is charged to be a negative voltage $-V_2$, which is lower than the ground potential at the terminal A at the time $t_3$, wherein no current flows through the electroluminescence lamp L. At the same time, the voltage of the point C is decreased to be the negative voltage $-V_2$, so that the field effect transistor 231 is biased in a reverse direction. In this state, however, no current flows through the field effect transistor 231 in the presence of the diode 233. That is, the field effect transistor 231 functions as being in an OFF state, although it is turned on by the switching signal b. At the next time $t_4$, one period of a driving voltage has completed, when the field effect transistor 230 is turned on. During the period $t_3$ to $t_4$, the field effect transistors 230 and 231 are turned off, and the voltage of the electroluminescence lamp L is increased at the terminal A to be a negative voltage $-V_2'$ at the time $t_4$ due to the self-discharge thereof. The above described operation of the times $t_0$ to $t_4$ is repeated to continue driving the electroluminescence lamp L. In the third preferred embodiment, the capacitor 234 is a bias capacitor for stabilizing the DC output voltage of the DC-DC converter 100.

Figures 19, 20:
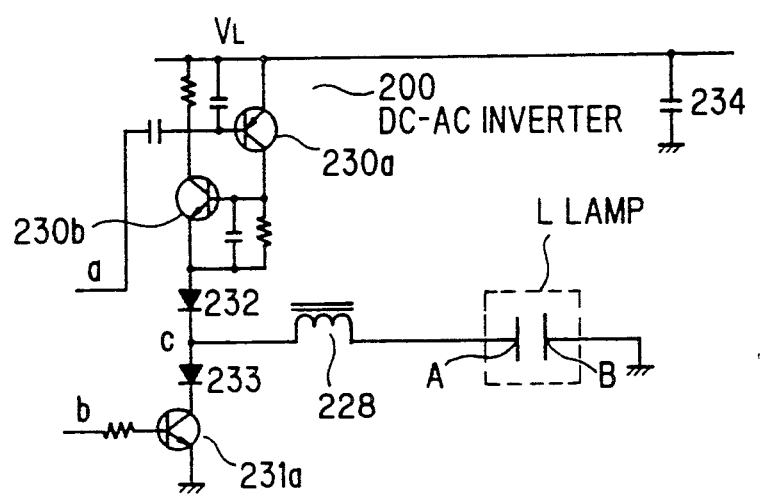
FIG. 19 is a circuitry diagram showing a first modification of the third preferred embodiment.
FIG. 20 is a timing chart explaining operation in the first modification in the third preferred embodiment.

FIG. 19 shows a modification of a circuit for driving an electric field luminous lamp in the second preferred embodiment, wherein the field effect transistor 230 is replaced by two transistors 230a and 230b having a thyristor structure, and the field effect transistor 231 is replaced by a transistor 231a.

In operation, a trigger signal a is supplied to the transistors 230a and 230b having the thyristor structure which is thereby turned on, as shown in FIG. 20, while no signal is supplied to the thyristor structure which is turned off, when a current flowing through the thyristor structure becomes zero. The transistor 231a is controlled to be turned on and off by the same switching signal b as supplied thereto in FIG. 18.

Figure 21:
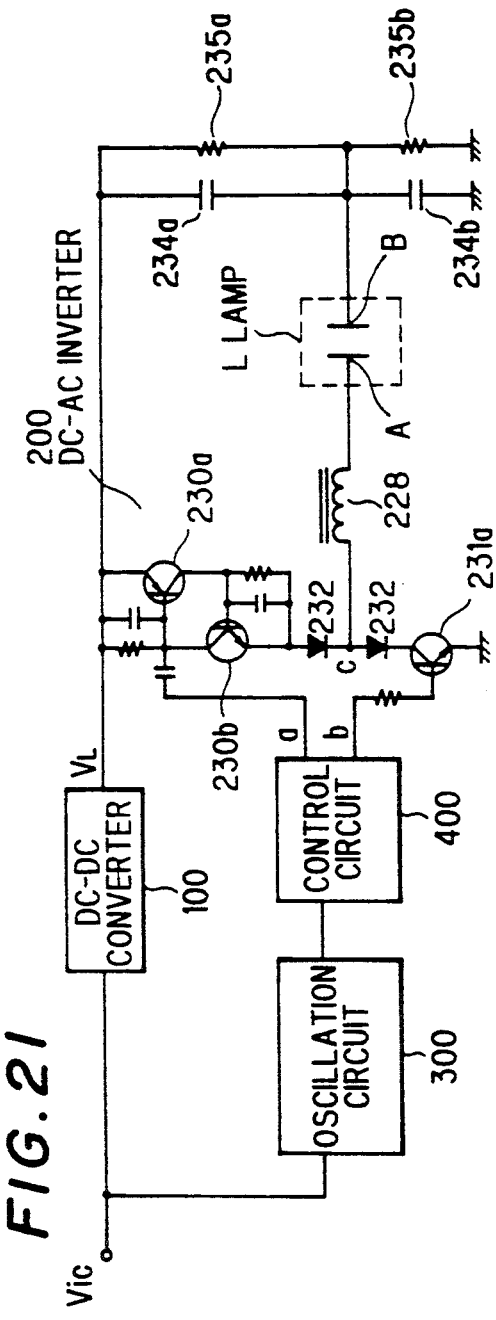
FIG. 21 is a circuitry diagram showing a second modification of the third preferred embodiment.
Figure 22:
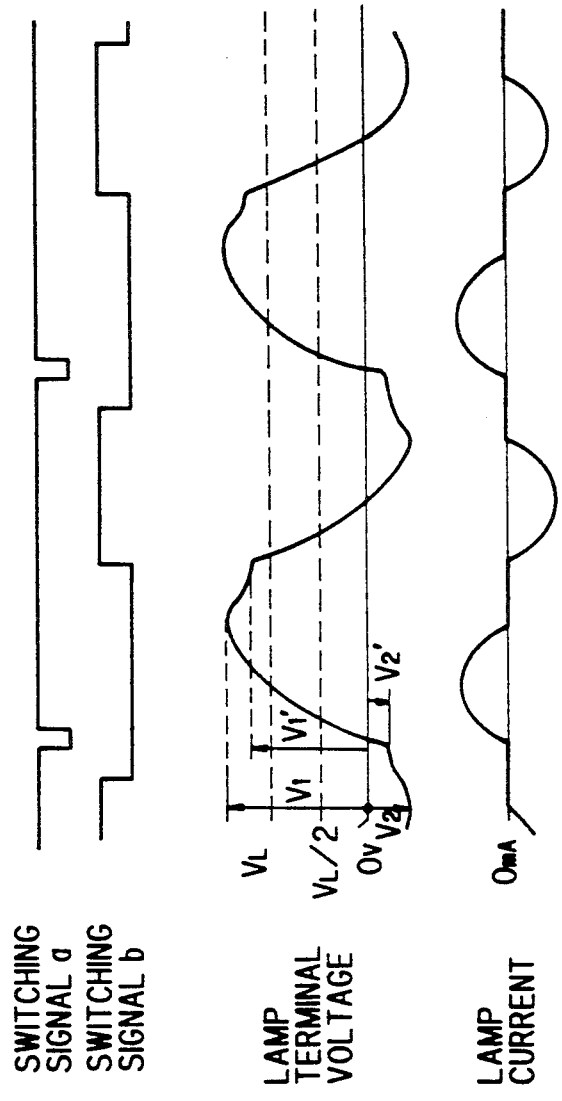
FIG. 22 is a timing chart explaining operation in the second modification in the third preferred embodiment.

FIG. 21 shows another modification of a circuit for driving an electric field luminous lamp in the second preferred embodiment, wherein like parts are indicated by like reference numerals and symbols as used in FIGS. 17 and 19, except that the electroluminescence lamp L is connected at the terminal B to a common connecting point between capacitors 234a and 234b having the same capacitance values, and between resistances 235a and 235b having the same resistive value.

Operation is realized in the same manner as explained in FIG. 18, except that a voltage applied to the electroluminescence lamp L is symmetrical in regard to positive and negative waveform as shown in FIG. 18, because a voltage at the terminal B of the electroluminescence lamp L is not the ground potential, but a potential which is half the DC output voltage of the DC-DC converter 100, as apparent from the circuit structure of the capacitors 234a and 234b, and the resistances 235a and 235b.

Although the invention has been described with respect to specific embodiments for complete and clear disclosure, the appended claims are not to be thus limited but are to be construed as embodying all modification and alternative constructions that may occur to one skilled in the art which fairly fall within the basic teaching herein set forth.

What is claimed is:

1. A circuit for driving an electric field luminous lamp, comprising:
    a DC-DC converter including a peak current detecting means for generating a constant DC electric power output, said DC-DC converter being connected to a DC power supply, said DC-DC converter including a transformer, a switching means connected to a primary winding of said transformer, and a control circuit for controlling ON and OFF of said switching means, wherein said peak current detecting means detects a current flowing through said primary winding of said transformer, when said switching means is turned ON, and controls a duration for which said switching means remains ON to maintain a constant peak current, such that the DC-DC converter supplies a constant electric power therefrom; and
    a DC-AC inverter for applying an AC voltage to said electric field luminous lamp to be driven, said DC-AC inverter receiving said constant DC electric power output.

2. A circuit for driving an electric field luminous lamp, comprising:
    a DC-DC converter for generating a DC electric power output, said DC-DC converter being connected to a DC power supply;
    a DC-AC inverter including switching means for applying an AC voltage to said electric field luminous lamp to be driven, said DC-AC inverter receiving said DC electric power output;
    a control circuit for generating timing control signals supplied to said DC-AC inverter; and
    a choke coil connected in series to said luminous lamp to provide a serial resonant structure;
    wherein a frequency of said AC voltage is determined in said DC-AC inverter by said switching means receiving said control signals supplied from said control circuit; and
    an inductance of said choke coil is set such that a resonant frequency of said serial resonant structure is higher than a frequency of said AC voltage.

3. A circuit for driving an electric field luminous lamp, according to claim 2, wherein:
    said switching means of said DC-AC inverter is provided on both sides of said serial resonant structure, said switching means being alternatively turned on, to change a direction in which said AC voltage is applied to said serial resonant structure, in accordance with the frequency of said AC voltage, whereby said electric field luminous lamp is charged alternately in opposite directions by said AC voltage, said alternate charges of said electric field luminous lamp being discharged during an intermittent time between charging periods of said AC voltage.

4. A circuit for driving an electric field luminous lamp, according to claim 2, wherein:
    said switching means of said DC-AC inverter is provided on one side of said serial resonant structure, said switching means being turned on to apply said AC voltage to said serial resonant structure intermittently in accordance with the frequency of said AC voltage, whereby said electric field luminous lamp is charged in one direction by said AC voltage, and electric charges of said electric field luminous lamp are discharged during an intermittent time between charging periods of said AC voltage.

5. The circuit for driving an electric field luminous lamp as claimed in claim 2, wherein the control circuit includes:
    an oscillation circuit for determining an oscillation frequency of the DC-AC inverter, and
    a timing control circuit for turning each switch On and OFF, said oscillation and timing control circuits maintaining a constant oscillation frequency of the DC-AC converter, regardless of capacitance changes in said electric field luminous lamp.

6. A circuit for lighting an electric field luminous lamp by converting a DC voltage to an AC voltage to be applied thereto, comprising:
    a choke coil connected in series to said electric field luminous lamp to provide a serial resonant structure, said choke coil having an inductance to provide a resonant frequency which is higher than a frequency of said AC voltage;
    a first pair of switches provides on both sides of said serial resonant structure, respectively, and connected to a first potential of said DC voltage;
    a second pair of switches provided on said both sides of said serial resonant structure, respectively, and connected to a second potential of said DC voltage; and
    a control circuit for generating control signals to control said first and second pairs of switches;
    wherein said electric field luminous lamp is charged in first and second directions by said DC voltage by control of said first and second pairs of switches, such that charges formerly accumulated in said electric field luminous lamp in said first direction are discharged by closing both sides of said serial resonant structure, thereby providing a reverse charging effect upon said electric field luminous lamp by a resonance of said serial resonant structure, and said first potential of said DC voltage is applied in said second direction to said serial resonant structure, such that a time duration for switching-off is allocated between charging in said first direction and discharger in said second direction, and between charging in said second direction and discharging in said first direction.

7. A circuit for lighting an electric field luminous lamp by converting a DC voltage to an AC voltage to be applied thereto, comprising:

a choke coil connected in series to said electric field luminous lamp to provide a serial resonant structure, said choke coil having an inductance to provide a resonant frequency which is higher than a frequency of said AC voltage;

first and second switches both provide don one side of said serial resonant structure, said first switch being connected to a first potential of said DC voltage and said second switch being connected to a second potential of said DC voltage; and a timing control circuit for generating control signals at a period corresponding to said frequency of said AC voltage;

wherein said electric field luminous lamp is charged in first and second directions by said DC voltage by control of said first and second switches, such that charges formerly accumulated in said electric field luminous lamp by use of said second switch are discharged by use of said first switch thereby providing a reverse charging effect upon said electric field luminous lamp in said serial resonant structure, and charges accumulated in said electric field luminous lamp by use of said first switch are discharged by use of said second switch, thereby providing a reverse charging effect upon said electric field luminous lamp in said serial resonant structure, whereby one period of said AC voltage is completed, and such that a time duration for switching-off said first and second switches is allocated between charging by said first switch and subsequent discharging by said second switch, and between charging by said second switch and subsequency discharging by said first switch.

8. A circuit for driving an electric field luminous lamp, comprising:

a DC-DC converter for generating a DC electric power output, said DC-DC converter being connected to a DC power supply;

a DC-AC inverter including switching means for applying an AC voltage to said electric field luminous lamp to be driven, said DC-AC inverter receiving said DC electric power output;

a control circuit for generating timing control signals supplied to said DC-AC inverter; and a choke coil connected in series to said luminous lamp to provide a serial resonant structure; wherein a frequency of said AC voltage is determined in said DC-Ac inverter by said switching means receiving said control signals supplied from said control circuit; and an inductance of said choke coil is set such that a resonant frequency of said serial resonant structure is higher than a frequency of said AC voltage, wherein:

said switching means of said DC-AC inverter is provided on one side of said serial resonant structure, said switching means being turned on to apply said AC voltage to said serial resonant structure intermittently in accordance with the frequency of said AC voltage, whereby said electric field luminous lamp is charged in one direction by said AC voltage, and electric charges of said electric field luminous lamp are discharged during an intermittent time between charging periods of said AC voltage, and said DC-AC inverter includes serially connected capacitors with a common connecting point between the ground and an output terminal of said DC-DC converter, and another side of said serial resonant structure is connected to said common connecting point of said serially connected capacitors for applying half the DC output voltage of said DC-DC converter.

* * * * *